Patented Feb. 20, 1940

2,191,372

UNITED STATES PATENT OFFICE 2,191,372

PROCESS OF TREATING PETROLEUM OILS

Joseph W. Cushman, Oklahoma City, Okla., assignor, by mesne assignments, to Kactus Company, Inc., St. Jo, Tex., a corporation of Delaware No Drawing. Application June 24, 1936, Serial No. 86,895. Renewed May 20, 1938

10 Claims. (Cl. 196—4)

My invention relates to compositions and processes for the treatment of wet oils, such as petroleum and its by-products, for the separation of water or the like in water-in-oil emulsions.

More particularly defined, my invention has for its principal object the production of a chemical compound, or composition of matter, suitable for the treatment of petroleum and petroleum emulsions, particularly while such petroleum in its emulsified state is still in the oil well sand formation. By reference to sand formations, I mean those conditions present in the sands in the bottom of an oil well, effected by a disturbance in such sands caused by the sands shifting, gas pressures, water encroachment, and various other causes. A large proportion of all "cut oils" results from such disturbance and my invention, resulting from certain discoveries and experiments, will correct these conditions by the separation of natural waters and the like from the petroleum or other oils.

My invention, however, is not limited or confined particularly to the treatment of petroleum in oil wells, as oils may be treated by my composition while the petroleum is contained in tanks, after removal from the well.

The invention further comprises a demulsifying compound which will result in the production of an improved grade of petroleum product or by-product. This is due in part to the fact that no heat is utilized in treating the petroleum or other oils by the process and composition of the invention, hence no vaporization and consequent loss of any of the treated product will result. In treating, by the process and composition of the invention, oils of very low specific gravity, with practically no heat, I have eliminated from these "cut oils" all but a very small percentage of the water and foreign substances contained therein.

The composition of my invention comprises a macerated vegetable substance derived from the Cactaceae family or from the Leguminosae family or both, advantageously combined or admixed with phenol from tar, such as cresylic acid, naphthalene and a substantial quantity of an alkali.

In carrying out my invention, I preferably employ the cactus plant, principally of the prickly pear variety (but other species of the cactus plant family may be used) and the beans, leaves, bark, root or any part of the mesquite tree, bush, or plant, which might contain the sap. These materials are macerated and reduced to suitable particles by chopping or otherwise. The macerated materials are then soaked in warm water or in water of a temperature that will produce a swelled condition of the materials and for softening the outer skin or covering. These products are then ground into a pulpy condition, then placed in a container with sufficient water for boiling purposes. The boiling is continued until the consistency of the materials is in a syrupy condition, and to this there is added sodium hydroxide. I then allow the combined mass to stand for a time sufficient to thoroughly decompose all particles of pulp. Then the liquid portion is strained off and cresylic acid is added. Then the mixture is again heated and when the boiling point is reached, naphthalene is added. The boiling is continued for appproximately two hours and allowed to cool, after which relatively small amounts of commercial ammonium hydroxide and commercial hydrochloric acid are added. The process and the result will vary, however, according to the conditions of the materials used, particularly the cactus and the mesquite. As an example for preparing say about 50 gallons of the compound, approximately the following proportions may be taken of each ingredient:

| | |
|---|---|
| Cactus substance, in chopped form pounds | 120 |
| Mesquite substance, in chopped form do | 20 |
| Sodium hydroxide do | 18 |
| Phenol from tars gallons | 7 |
| Naphthalene pounds | 15 |
| Ammonium hydroxide (commercial) gallons | 1 |
| Hydrochloric acid (commercial) ounces | 6 |

Sufficient water to make 50 gallons.

I have found that considerable variation in the properties of the resulting compositions may be effected by varying the proportions of the ingredients and the conditions of various steps of the compounding operation, and my invention comprises within its scope compositions for the treatment of oil emulsion which include substances derived from plant material selected from the Cactaceae and Leguminosae families.

In the treatment of petroleum emulsions, suitable quantities are added to the emulsion either in situ in the wells or in suitable containers after removal from the wells. The amount of the composition necessary will, of course, vary with the nature of the oil and the character of the emulsion and can readily be determined by a simple test.

While I have also described in detail the preferred practice of my process and my preferred composition, it is to be understood likewise that the details of procedure and the proportions of ingredients may be varied to considerable extent, without departing from the spirit of my invention or the scope of the subjoined claims.

What I claim is:

1. A process of making compositions for the treatment of petroleum emulsions which comprises macerating a vegetable substance selected from the Cactaceae and Leguminosae, extracting the liquid portion from the macerated substance, and adding thereto phenol from tars, naphthalene, and an alkali.

2. A substance of the character described, said substance comprising the resultant of a mixture of macerated and comminuted sap-bearing matter of the Cactaceae family and Leguminosae family, sodium hydroxide, phenol from tars, naphthalene, ammonium hydroxide, and hydrochloric acid.

3. A process of making a substance of the character described, said process comprising forming a syrupy mass by macerating and comminuting sap-bearing matter of the Cactaceae and Leguminosae families and boiling the same, then decomposing the resultant by adding sodium hydroxide thereto, then draining off the liquid portion of the resultant and adding phenol from tars thereto followed by heating substantially to the boiling point, then adding thereto naphthalene while continuing the heating, then permitting the resultant to cool and then adding ammonium hydroxide thereto and hydrochloric acid.

4. A substance of the character described, said substance comprising the resultant of a mixture of approximately 120 pounds of macerated and comminuted sap-bearing matter of the Cactaceae family, 20 pounds of macerated and comminuted sap-bearing matter of the Leguminosae family, 18 pounds of sodium hydroxide, 7 gallons of phenol from tars, 15 pounds of naphthalene, 1 gallon of ammonium hydroxide, 6 ounces of hydrochloric acid, and water.

5. A process of making a composition for the treatment of petroleum which comprises macerating a vegetable substance selected from the Cactaceae and Leguminosae, extracting the liquid portion from the macerated substance, and adding thereto phenol from tars, naphthalene, and an alakli.

6. A process of making a composition for the treatment of petroleum which comprises macerating a vegetable substance selected from the Cactaceae and Leguminosae, extracting the liquid portion from the macerated substance, and adding thereto phenol, and an alkali.

7. A process of making a composition for the treatment of petroleum which comprises extracting a liquid portion from a substance selected from the class consisting of Cactaceae and Leguminosae, and adding thereto phenol from tar, and an alkali.

8. A process of making a composition for the treatment of crude petroleum which comprises mixing a vegetable substance obtained from the Cactaceae with a phenol, and an alkali.

9. A process of making a composition for the treatment of crude petroleum which comprises mixing a vegetable substance obtained from the Cactaceae with a phenol, an alkali, and naphthalene.

10. A process of making a composition for the treatment of crude petroleum which comprises mixing a vegetable substance obtained from the Cactaceae with phenol, an alkali, and a vegetable substance extracted from mesquite.

JOSEPH W. CUSHMAN.